Jan. 20, 1959          H. LECHNER          2,869,865
METHOD AND MEANS OF CONVEYING CARRIER STRIPS CARRYING LAYERS
TO BE TREATED CHEMICALLY AND/OR PHYSICALLY, ESPECIALLY
LAYERS CONSISTING OF LIGHT-SENSITIVE EMULSION, THROUGH
AT LEAST ONE TREATING DEVICE
Filed May 31, 1955
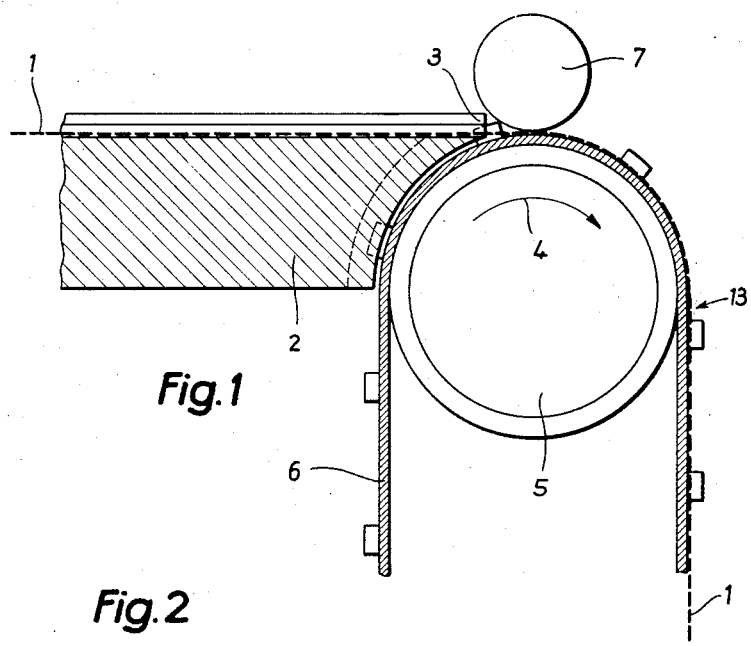
Fig.1
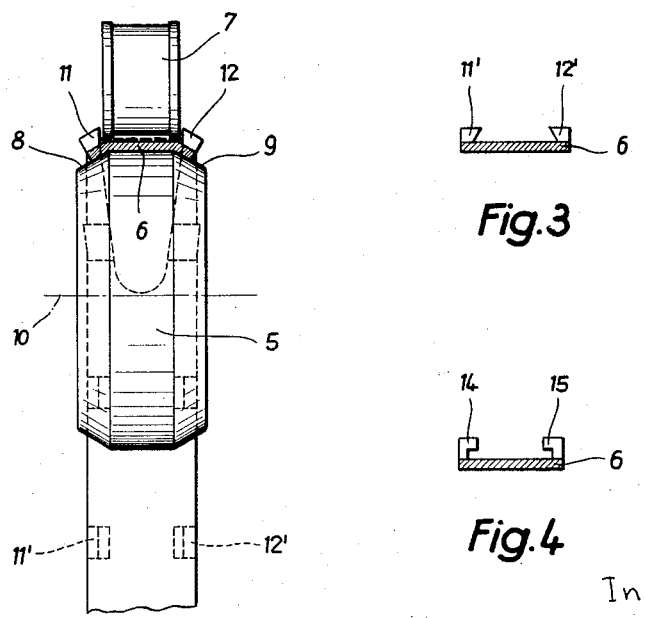
Fig.2
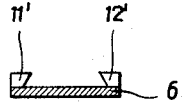
Fig.3
Fig.4
Inventor:
Herbert Lechner
By: Michael S. Struker
agt.

United States Patent Office 2,869,865
Patented Jan. 20, 1959

2,869,865

METHOD AND MEANS OF CONVEYING CARRIER STRIPS CARRYING LAYERS TO BE TREATED CHEMICALLY AND/OR PHYSICALLY, ESPECIALLY LAYERS CONSISTING OF LIGHT-SENSITIVE EMULSION, THROUGH AT LEAST ONE TREATING DEVICE

Herbert Lechner, Munich, Germany, assignor to Arnold & Richter K. G., Munich, Germany Application May 31, 1955, Serial No. 512,026

Claims priority, application Germany May 31, 1954

5 Claims. (Cl. 271—2.3)

Especially in the field of precessing photographic material it is frequently necessary to convey through one or more treating devices large quantities of carrier strips carrying layers consisting of photo-sensitive emulsion, which layers are to be chemically and/or physically treated or processed. In this field it is necessary, for example, continuously to convey motion picture films through developing, fixing and rinsing baths as well as through drying plant. Similar operations have to be performed in the case of strips of photographic paper and, to quote another example, where sound recording tapes have to be processed.

All of the hitherto known methods of conveying carrier strips of the type indicated above through one or more treating devices have in common the feature that the carriers bearing the chemical layers are exclusively trained over guide pulleys or sets of guide pulleys, use being made where desired of perforations present in said carriers, these known methods thus requiring the said layer carriers to absorb the tensile forces which have to be applied in order to cause said carriers to travel along the desired path. It will be appreciated that where these known methods are used, the valuable film or paper material is of necessity subjected to considerable stresses. These methods are known to result in undesirable, frequently permanent, elongation of the carrier material, and in many cases the layer carrier is even torn apart, this frequently rendering unusable large parts of an irreplaceable exposed film strip.

Where short lengths of film, especially individual film pack sheets and X-ray films, are to be processed in a continuous operation, it has been necessary to join such films together, this method tending to increase the risk of the strips thus formed being torn apart. Another drawback inherent in this method resides in the fact that it is necessary always to load the entire processing machine with film material extending between both ends of said machine.

According to the invention, in a method of conveying carrier strips carrying layers to be treated chemically and/or physically, especially layers consisting of light-sensitive emulsion, through at least one treating device, using sets of guide pulleys, the hereinbefore mentioned drawbacks are eliminated by providing for said carrier strips to be detachably secured to at least one endless supporting belt or band preferably consisting of a rubber or plastic composition, and by providing for said carrier strips to be conveyed, together with said belt or band, over said guide pulleys and through the said treating device. All stresses to which the layer carriers to be conveyed would otherwise be subjected are thus absorbed by the said supporting belt, the result being that the risk of the carrier being elongated, strained or torn apart is completely eliminated. It will be understood that it is of no importance whether the layer carrier has perforations on either side or on one side only or whether it has no perforations at all. Moreover, it is possible for the supporting belts to receive pieces of layer carriers of any desired length and to convey such pieces through the treating device without it being necessary to join such pieces together.

In a preferred embodiment of the invention the layer carriers are detachably secured to the supporting belt by holding means mounted on the longitudinal margins of the belt. These holding means may, for example, take the form of hook-shaped guide members. Provision may also be made for one such guide member mounted on the longitudinal edge of the belt to co-operate with another guide member of complementary shape mounted on the other longitudinal edge of the belt in such a manner as to form a dovetailed guide way. According to another feature of the invention, one endless supporting belt each may be associated with different treating devices, and suitable guide passages for the carrier strip may be provided in front and to the rear, respectively, of the points at which the carrier strip is fed onto and removed from the supporting belt. According to this another feature of the invention, the reception of the carrier strips by the supporting belts serving as conveying means and the transfer of the carrier strips to an adjacent separate supporting belt may be facilitated by the provision, at the points of loading and unloading, of guide pulleys the outer circumferential edges of which are bevelled towards the axis of the guide pulley. According to still another feature of the invention, there may be provided on the reverse sides of the longitudinal edges of the supporting belts suitable tooth-like projections which are adapted, when said belts are in the proper position in relation to said guide pulleys, to be received in correspondingly shaped recesses provided in said guide pulleys.

These and other objects and advantages of the invention will become further apparent on the following detailed description, reference being made to the accompanying drawings showing a preferred embodiment of the invention.

In the drawings:

Fig. 1 is a part of a side elevation, partly in section, of the preferred embodiment;

Fig. 2 is a front elevation of Fig. 1; and

Figs. 3 and 4 are illustrative examples of profile shapes of the holding means referred to.

As will be seen from Figs. 1 and 2, the carrier strip or layer carrier 1 passes along its guide way 2 to the means designed to convey said strip or carrier through the treating devices, particularly through the processing baths. At the point of entry 3, the carrier strip 1 is fed between a pressure roller 7 and the supporting belt 6, which latter is supported and moved in the direction of arrow 4 by the guide pulley 5. It will be seen from Fig. 2 that the loading guide pulley 5 has its circumferential edges 8 and 9 bevelled towards its axis 10 and that this arrangement serves, when the supporting belt 6 runs over the guide pulley, to spread apart the hook-shaped guide members 11 and 12 carried by the margins of the belt so as to permit the carrier strip 1 to be properly received between said hook-shaped guide members. Upon said guide members leaving the loading guide pulley 5 at the point 13 so that they are no longer under the influence of the bevelled circumferences of the guide pulley 5, the guide members will resume their non-spread position in relation to the belt 6, thus securely holding in position the carrier strip 1 received between them.

In the arrangement of Figs. 1 and 2, pairs of guide members provided on the opposite edges of the supporting belt 6, for example the pairs comprising the guide members 11, 12 or 11', 12', co-operate to form dovetailed guides of the type shown in transverse section in Fig. 3. However, the said holding means may also take the form of grooved or shouldered members substantially of hook shape such as shown in Fig. 4 illustrating the hooks 14 and 15.

Where guide pulleys having smooth peripheral surfaces are used, the under side of the supporting belt 6 is also smooth. However, the two co-operating surfaces of the guide pulley or pulleys and the supporting belt may also be roughened. If desired, the under side of the belt 6 may be made to carry tooth-like projections which are adapted, when the pulley is in the appropriate position in relation to the belt, to be received in suitable recesses provided in the guide pulley or pulleys.

In one and the same treating device, for example in a processing bath, there may be provided a single conveying means of the type just described, this conveying means comprising only a single endless supporting belt. However, it is also possible in a single processing bath to arrange in succession a plurality of endless supporting belts. In the latter case, there is provided between adjacent ends of two successive belts a guide passage which is similar in construction to the hereinbefore described guide passage 2 and which serves temporarily to guide the carrier strips to be processed during their transit from one supporting belt to another.

When a carrier strip or layer carrier, for example a motion picture film, has to be treated in a succession of processing devices including several different processing baths, a single supporting belt may be used or each of the said devices is fitted with its own conveying means of the type described having an endless supporting and conveying belt of its own. Also in this case it is convenient to bridge the gaps present between any two successive baths by means of guide passages of the type described, which passages form connections between adjacent ends of two successive belts. Those guide pulleys which serve at the end of each belt to transfer the carrier strip to an adjacent guide passage leading to the next following conveying system are again conveniently made with their ends bevelled towards the pulley axis as described earlier so that these guide pulleys cause the holding means to be spread apart so as to facilitate the transfer of the carrier strip to the next following guide passage.

The supporting and conveying belts or bands may be made of metal, but belts or bands made of suitable rubber or plastic compositions may be preferred, as they are the least susceptible to chemical attack. Various other changes and modifications may also be made without departing from the spirit and scope of the present invention and it is intended that such obvious changes and modifications be embraced by the annexed claims.

Having thus particularly described the invention, what is claimed as new and desired to be secured by Letters Patent is:

1. In a conveyor arrangement for conveying strip material, in combination, a conveyor band made of deformable material; gripping means attached to and carried by said conveyor band in the regions of the opposite edge portions of the same and extending upwardly from one face thereof for gripping a strip material; and guide roller means for guiding said conveyor band, operatively connected wtih the same and adapted to engage successive longitudinal portions of said conveyor band, at least said portion of said guide roller means over which one of said opposite edge portions of said conveyor band passes being tapered so that the gripping means carried by said one edge portion of said conveyor band when passing over said guide roller means will be turned away from the corresponding gripping means carried by the other edge portion of said conveyor band.

2. In a conveyor arrangement for conveying strip material, in combination, a conveyor band made of deformable material; gripping means attached to and carried by said conveyor band in the regions of the opposite edge portions of the same and extending upwardly from one face thereof for gripping a strip material; and guide roller means for guiding said conveyor band, operatively connected with the same and adapted to engage successive longitudinal portions of said conveyor band, at least said portions of said guide roller means over which said opposite edge portions of said conveyor band pass being tapered so that the gripping means carried by one of said edge portions of said conveyor band when passing over said guide roller means will be turned away from the corresponding gripping means carried by the other edge portion of said conveyor band.

3. In a conveyor arrangement for conveying strip material, in combination, a conveyor band made of deformable material; gripping means attached to and carried by said conveyor band in the regions of the opposite edge portions of the same and extending upwardly from one face thereof for gripping a strip material, said gripping means comprising a plurality of spaced hook-shaped members each having a shoulder portion spaced from and extending towards the center of and parallel to said one face of said conveyor band so as to define free spaces between said one face of said conveyor band and said shoulder portions, respectively, of said hook-shaped members, for gripping said strip material without engaging the top face thereof; and guide roller means for guiding said conveyor band, operatively connected with the same and adapted to engage successive longitudinal portions of said conveyor band, at least said portion of said guide roller means over which one of said opposite edge portions of said conveyor band passes being tapered so that the gripping means carried by said one edge portion of said conveyor band when passing over said guide roller means will be turned away from the corresponding gripping means carried by the other edge portion of said conveyor band.

4. In a conveyor arrangement for conveying strip material, in combination, a conveyor band made of deformable material; gripping means attached to and carried by said conveyor band in the regions of the opposite edge portions of the same and extending upwardly from one face thereof for gripping a strip material, said gripping means comprising a plurality of spaced dove tail-shaped members each having a shoulder portion spaced from and extending towards the center of said one face of said conveyor band so as to define free spaces between said one face of said conveyor band and said shoulder portions, respectively, of said dovetail-shaped members, for gripping said strip material without engaging the top face thereof; and guide roller means for guiding said conveyor band, operatively connected with the same and adapted to engage successive longitudinal portions of said conveyor band, at least said portion of said guide roller means over which one of said opposite edge portions of said conveyor band passes being tapered so that the gripping means carried by said one edge portion of said conveyor band when passing over said guide roller means will be turned away from the corresponding gripping means carried by the other edge portion of said conveyor band.

5. In a conveyor arrangement for conveying strip material, in combination, a conveyor band made of deformable material and having two elongated edge portions along the edges of the band and an elongated central portion therebetween; holding means attached to one face of said conveyor band within said edge portions thereof for holding a strip material when said conveyor band is in transversally unbent position; and roller means including a roller having a cylindrical peripheral portion having a width equal to the width of said central portion of said conveyor band and engaging the same along a longitudinal portion of said conveyor band, and also including means on the roller, engageable with the edge portions of the band to cause the said edge portion together with said holding means to bend outwardly and away from each other, so that during passage of said conveyor band over said roller means the edge portions of said conveyor band together with the holding means attached thereto bend outwardly and away from each other whereby during passage of said conveyor band over said roller means a strip material may be applied to said central portion of the conveyor band between said outwardly moved holding means, and said holding means automatically hold the thus-applied strip material after passage of the conveyor band over said roller means due to automatic transversal straightening of the band and consequent turning of the holding means towards each other.

References Cited in the file of this patent

UNITED STATES PATENTS

| | | |
|---|---|---|
| 1,001,957 | Ivatts | Aug. 29, 1911 |
| 1,658,094 | Paschen et al. | Feb. 7, 1928 |
| 1,819,848 | Simjian | Aug. 18, 1931 |